Patented Sept. 6, 1949

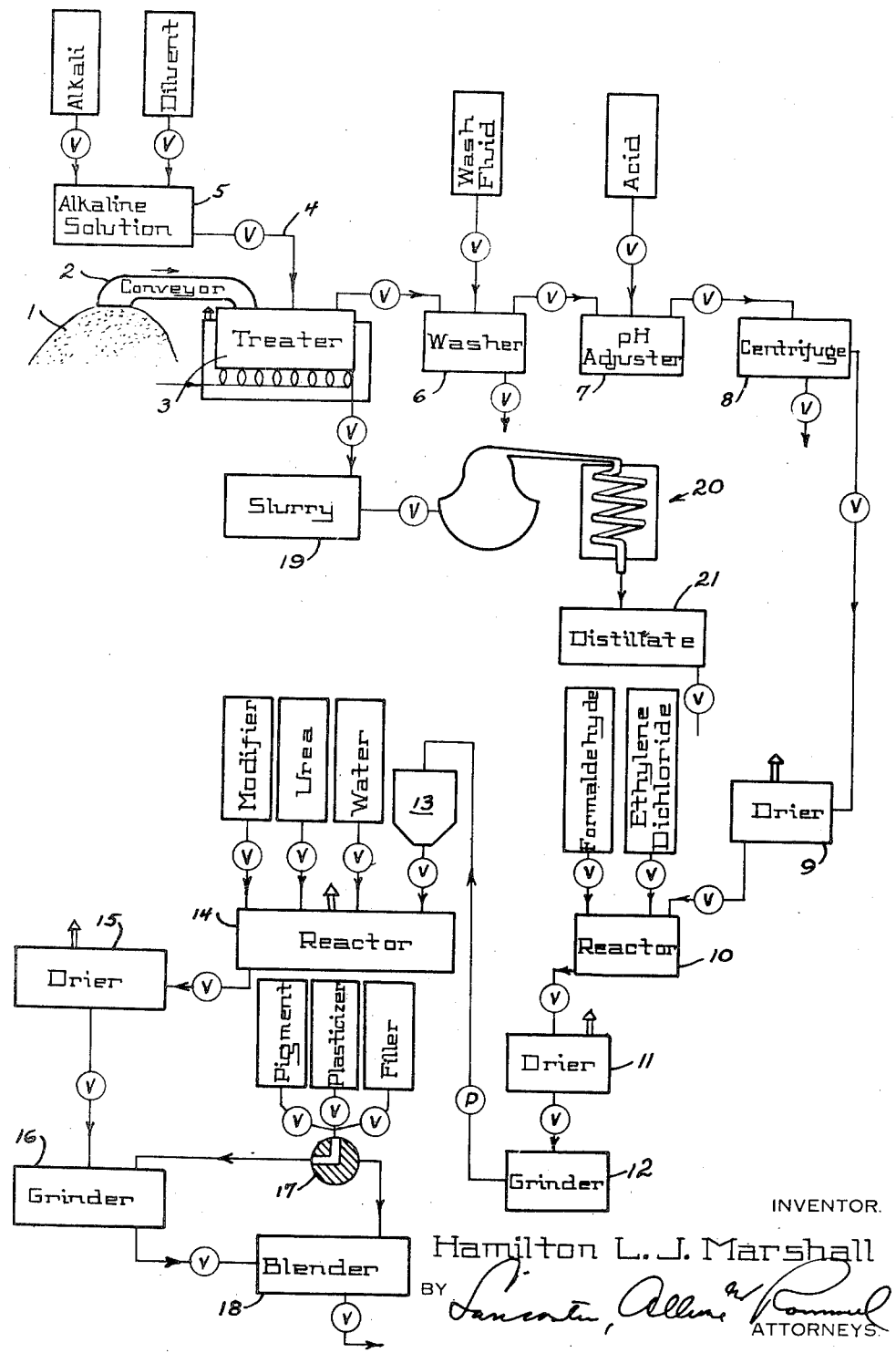

2,481,136

UNITED STATES PATENT OFFICE 2,481,136

THERMOSETTING SYNTHETIC MOLDING COMPOSITION AND PROCESS FOR ITS MANUFACTURE

Hamilton L. J. Marshall, Mobile, Ala., assignor to Paterson Plastics Co., Mobile, Ala.

Application July 24, 1947, Serial No. 763,341

6 Claims. (Cl. 260—17.3)

This invention relates to a novel thermosetting synthetic molding composition and process for its manufacture.

The use of wood in the form of sawdust, wood flour and the like, as a filler in synthetic molding compositions and in products in which synthetic molding compositions are employed in their manufacture, has been known substantially since the first commercial use of synthetic molding compositions, but I have discovered that cellulose, such as disintegrated wood in the form of sawdust, wood flour and the like, may be employed, not merely as a filler in a synthetic plastic, but as the major constituent, may be altered by the process to be disclosed herein, so that it loses parts of its physical and chemical identities, and the resulting composition of matter may be employed in the manufacture of articles having good hardness, desirable tensile and impact strength, and low water absorption and flammability characteristics, as will be set forth more fully in this specification.

In the use of cellulose materials in synthetic plastics, such materials have been employed in the form of sawdust or wood flour as fillers or in the form of fibres as binders, and it had been considered that, as fillers or binders, or both, their proportions must be relatively low, if the resultant plastics were to be employed in the manufacture of articles having good hardness, and good tensile and impact strengths. I have discovered that I can employ far above the maximum proportions of cellulose materials heretofore thought critical, and provide a thermosetting, synthetic plastic having good molding qualities at, for example, a compression molding temperature of but 275° F., at a pressure of 4000 p. s. i., with a compression ratio of 3.4.

With this novel thermosetting synthetic plastic, there may be produced articles having, for example, a tensile strength of 4,750 p. s. i., an impact strength (notched izod) of .36 foot pound per inch of notch, and a Rockwell hardness of M-92.1.

Wood filler-containing synthetic plastics have been recognized generally as producing articles poor in resistance to water absorption and flammability. It would be assumed that an article, manufactured by the use of a synthetic plastic produced by the employment of a large percentage of wood flour or sawdust, would be proportionally undesirable insofar as water absorption and flammability are concerned, but I have discovered that such is not the case when the cellulose is at least partially altered as I will set forth more fully hereinafter. In fact, articles manufactured by the employment of my novel thermosetting synthetic plastic have an average water absorption of 1.05%, and A. S. T. M. standard flammability tests indicate that the specimens were self-extinguishing after average ignitions of 30 seconds each.

Arc resistance under A. S. T. M. standard tests on articles, wherein my novel plastic was employed in their manufacture, showed an average resistance of 17.7 and tests for volume resistivity, employing 10 centimeter electrodes, averaged $91 \times 10^6$ megohm-inches.

Other objects and advantages of this invention will be apparent during the course of the following detailed description of the invention, taken in connection with the accompanying drawing containing a single figure showing diagrammatically the steps in the process of manufacture of the novel thermosetting synthetic plastic.

The cellulose material, forming the major ingredient of the plastic may be cellulose material in the form of sawdust, wood flour, shredded wood or mixture of these. Preferably, pine wood sawdust is employed.

Substantially 100 pounds of the cellulose material in the form of pine sawdust, is contacted with a suitable alkaline solution by being conveyed from the pile 1, by conveyor 2, to a suitable vessel 3 containing the solution, which may be introduced thereinto by conduit 4 from a mixing vessel 5 into which flows the alkali and diluent. This solution may be of 2 pounds of a suitable hydroxide (preferably sodium hydroxide) in 50 gallons water. The cellulose material and solution are heated to the boiling point of the solution and maintained at substantially the boiling point for one hour. The alkali treated sawdust, substantially freed of oils, tars, rosins and the like, is then removed to a washer 6 and thoroughly washed, as with water, to remove traces of the solution. Its pH is then checked and it is treated, as in the pH-adjusting vessel 7, with a suitable acid, such as a 10% concentration of acetic acid. However, citric, tartaric or oxalic acid may be employed. When the sawdust material has reached a pH of substantially 6.5 it is in the best condition for subsequent treatment.

The sawdust material may be subjected next to centrifugal action in the centrifuge 8 and, when freed of most moisture, further dried in the dryer 9, and conveyed to a mixer reactor 10 where it is treated with formaldehyde and ethylene dichloride. Preferably, 43 pounds of 37% formaldehyde is employed with ethylene dichloride at the rate of 2 ounces per gallon of formaldehyde solution. This treatment continues for substantially one hour, whereupon the solid material is drawn off and suitably dried, as in the drier 11, then ground in a mill 12 and, when of a suitable fineness (preferably, a fine dust) conveyed to a bin 13 adapted to discharge measured quantities thereof into a reactor 14. Measured quantities of urea crystals, and volumes of water are also discharged into the reactor 14 and, if desired, a modifier may be added.

For example, to substantially 100 pounds of treated dust, discharged from the bin 13 into the reactor 14, is added substantially 25 pounds urea crystals and three gallons water. Preferably two hours' treatment is required in the reactor 14, with the latter suitably ventilated. If the reaction takes place too rapidly, any desired well-known retarder may be added so as to slow the same. There will be a decided drop in temperature at the expiration of the two hour period.

The now generally physically and chemically altered cellulose material (it has been discovered that about 10% by weight of the cellulose has not lost its identity or has lost it only slightly).

It should be pointed out that this 10% mentioned comprises hard fibers and these need not be removed. They may be regarded as the cellulose filler of the final product. Since the treated wood provides, in my novel synthetic plastic, only a negligible or very minor proportion of the necessary filler, any suitable inert filler may be added as required.

After drying, as in a dryer 15, the material may be ground, together with suitable quantities of desirable pigments, plasticizers if required, and added fillers, in a grinder 16, or the modified cellulose material may be ground by itself in the grinder 16 and then conveyed to a blender 18 for mixing with the pigments, plasticizers and/or fillers, such as clays, fibreglass, and mica products, since a two-way valve 17 may be provided as shown, in combination with other valves, whereby the three additions (or any of them) may be conveyed either to the grinder 16 or blender 18. The product resulting from the treatments described and discharged from the blender 18, is the thermosetting synthetic plastic. The irregularly shaped granules thereof are quite readily powdered between the fingers, appear pitted and only here and there, in the mass, may cellulose fibres be recognized.

The slurry from the vessel 3 may be drawn off to a slurry reservoir or tank 19 and from thence conveyed to a distilling apparatus 20, for recovery of oil, the recovered oil being conveyed to a suitable storage vessel 21.

In order to provide a thermosetting synthetic plastic which may be employed for the manufacture of such articles as door knobs, drawer pulls, cooking utensil handles and tool handles, substantially 100 pounds of alkali-treated and neutralized sawdust is treated, as described, but with 25 pounds of 37% formaldehyde and, subsequently, with 35 pounds urea crystals and 10 gallons water. This provides a plastic which may be used for the manufacture of articles that are apt to be subjected to considerable strain.

It has been found, for example, that, at a compression molding temperature of about 275° F., and a compression molding pressure of substantially 4000 pounds per square inch and continued for approximately five minutes, the plastic (with the lesser urea portion employed) will produce articles which, after conditioning 48 hours at about 77° F., and 50% relative humidity, will have the qualities heretofore mentioned, as to tensile and impact strength, Rockwell hardness, etc., all of the tests having been made in accordance with A. S. T. M. standards.

Moulded articles made by the use of my new thermosetting synthetic plastic, have a uniformly pleasing surface appearance, not dull nor pitted, and having, when desired, sharp, clean edges.

The weights mentioned in this specification are avoirdupois weights, and by the terms "negligible" and "very minor" proportions I mean proportions which would be, by themselves, insufficient to provide good or sufficient filler qualities in a thermosetting synthetic plastic.

What is claimed is:

1. The steps in the process for the production of a thermosetting synthetic plastic, which comprise contacting substantially chemically-neutral, oil-free, disintegrated wood with formaldehyde and ethylene dichloride, and subsequently contacting the formaldehyde-ethylene dichloride-treated material with a solution of urea.

2. The steps in the process for the production of a thermosetting synthetic plastic, which comprise contacting substantially chemically-neutral, oil-free, disintegrated wood with formaldehyde and ethylene dichloride, said wood being the major ingredient, by weight, contacting the formaldehyde-ethylene dichloride-treated material with a solution of urea, drying said formaldehyde-ethylene dichloride-urea-treated material, and adding an inert filler, said treated wood providing only negligible filler qualities to said plastic.

3. The steps in the process of producing a thermosetting synthetic molding composition which comprise contacting substantially 100 pounds chemically-neutral, oil-free, dried disintegrated wood with from 25 to 43 pounds of substantially 37% formaldehyde and a minor weight of ethylene dichloride, drying said formaldehyde-ethylene dichloride-treated wood, treating said dried, formaldehyde-ethylene dichloride-treated wood with 25 to 35 pounds urea crystals dissolved in water, drying the formaldehyde-ethylene dichloride-urea-treated material, and adding a filler, said dried, formaldehyde-urea-treated material having only minor filler qualities in said plastic and said minor weight of ethylene dichloride being substantially 2 ounces per gallon formaldehyde solution.

4. The steps in the process of producing a thermosetting synthetic molding composition which comprise contacting substantially 100 pounds chemically-neutral, oil-free, dried disintegrated wood with substantially 43 pounds of 37% formaldehyde and a minor weight of ethylene dichloride, drying said formaldehyde-ethylene dichloride-treated wood, and treating the dried formaldehyde-ethylene dichloride-treated wood with substantially 25 pounds urea crystals dissolved in three gallons water, drying the formaldehyde-ethylene dichloride-urea-treated material, said material imparting only negligible filler qualities to said plastic, said minor weight of ethylene dichloride being substantially 2 ounces per gallon formaldehyde solution.

5. A thermosetting synthetic molding composition including, as an essential ingredient, formaldehyde-ethylene dichloride-urea-treated wood, characterized by said treated wood having only negligible filler qualities in said composition.

6. A thermosetting synthetic plastic including as an essential ingredient formaldehyde-ethylene dichloride-urea-treated disintegrated wood, characterized by said treated wood imparting good plastic qualities and only negligible filler qualities to said plastic.

HAMILTON L. J. MARSHALL.

REFERENCES CITED

The following references are of record in the file of this patent:

UNITED STATES PATENTS

| Number | Name | Date |
|---|---|---|
| 2,313,953 | Loughborough | Mar. 16, 1943 |